United States Patent Office 3,560,380
Patented Feb. 2, 1971

3,560,380
DRY CONCENTRATES FOR PREPARING HEMODIALYSIS SOLUTIONS
John H. Stade, Ferguson, Mo., assignor to Mallinckrodt Chemical Works, St. Louis, Mo.
No Drawing. Filed Oct. 28, 1968, Ser. No. 771,351
Int. Cl. C09k 3/00
U.S. Cl. 252—1                                7 Claims

ABSTRACT OF THE DISCLOSURE

Stable dry concentrates for preparing hemodialysis solutions comprising salts of sodium, magnesium and calcium and, optionally, also a potassium salt and dextrose, contain a substantial proportion of sodium acetate which has been spray-dried to a very low moisture content, e.g. not more than 0.2% by weight, the total moisture content of the concentrate being not greater than 0.75% by weight. Such concentrates show greatly increased resistance to caking and discoloration and even after prolonged storage dissolve completely in water to give clear colorless solutions.

BACKGROUND OF THE INVENTION (1) Field of the invention

The invention relates broadly to the field of hemodialysis, and more particularly to improved dry concentrates for preparing solutions useful in hemodialysis.

(2) Summary of the prior art

Hemodialyzers, popularly known as "artificial kidneys," are increasingly used in the care of patients suffering from impaired kidney function owing to disease or injury. Briefly, such devices are designed to remove waste matter from the blood by means of a semi-permeable membrane and a specially formulated salt solution which extracts the waste matter from the blood through the semi-permeable membrane. These solutions contain as their major components dextrose, sodium chloride and sodium acetate along with smaller amounts of the chlorides or acetates of calcium, magnesium and sometimes potassium. The salt solution must be replaced periodically with fresh solutions. The latter are ordinarily prepared and distributed as complete solutions, although dry salt concentrates which could be dissolved in a given volume of water to yield a solution of the proper composition would be more convenient and economical.

When the dry salts required for the hemodialysis solution are mixed and stored, even in moisture-impermeable containers, serious compatibility problems are encountered. After a time the dry concentrates become caked and discolored and undergo other deleterious chemical changes.

A major cause of these changes has now been traced to the moisture present in the sodium acetate. Commercially available anhydrous grades contain at least 0.5% moisture and it has been found that even such small amounts of moisture are sufficient to initiate the aforementioned chemical changes even in the absence of atmospheric moisture.

SUMMARY OF THE INVENTION

Among the objects of the present invention may be noted the provision of dry salt concentrates for the preparation of hemodialysis solutions which have acceptable shelf life; which resist caking and discoloration; and which yield clear colorless solutions in water. Other objects and features will be in part apparent and in part pointed out hereinafter.

The invention accordingly comprises the products hereinafter described, the scope of the invention being indicated in the following claims.

It has been found that sodium acetate having a moisture content sufficiently low for use in the present invention can conveniently be prepared by spray-drying a concentrated sodium acetate solution. By combining this sodium acetate with ordinary anhydrous grades of the other components, it is possible to prepare dry hemodialysis concentrates which resist caking and discoloration if protected from external moisture. These concentrates dissolve readily and completely in water to give clear colorless solutions having the proper composition and properties required for hemodialysis.

The invention further relates to dry compositions suitable for the preparation of hemodialysis solutions which comprise water-soluble, physiologically acceptable ionic salts of sodium, magnesium, and calcium and which may optionally include a potassium salt and dextrose. A substantial proportion of the sodium, for example about 30% by weight, is in the form of sodium acetate which has been spray-dried to a very low moisture content so that the total moisture content of the composition does not exceed about 0.75% by weight.

Unlike similar concentrates known heretofore, the dry concentrates prepared according to the present invention resist caking and discoloration and, even after prolonged storage, dissolve readily and completely in water to give clear, colorless solutions.

As examples of salts suitable for the purposes of the present invention may be mentioned the chlorides, acetates, lactates and gluconates of sodium, magnesium, calcium and potassium. It should be noted that if the salt meets the previously mentioned criteria, the anionic constituent is not otherwise important.

The following examples illustrate the invention.

EXAMPLE 1

Dry concentrate for preparing hemodialysis solutions

A dry concentrate useful for preparing hemodialysis solutions has the composition:

| | Parts by weight |
|---|---|
| Spray-dried sodium acetate | 100 |
| Sodium chloride | 201 |
| Magnesium acetate | 5.5 |
| Calcium chloride | 4.9 |
| Dextrose | 69 |
| Potassium chloride | 6.7 |

Except for the sodium acetate, ordinary anhydrous grades were used in this and the following formulations. The sodium acetate used in the above composition had a moisture content of less than 0.2% by weight. The other components of the composition were selected so that the total moisture content did not exceed 0.75% by weight. It has not been found possible to achieve these limits using any anhydrous sodium acetate now commercially available.

To prepare the hemodialysis solution, 1240 grams of this concentrate are dissolved in sufficient distilled water to make 100 liters.

Alternatively, dextrose may be omitted from the dry concentrate, in which case a useful hemodialysis solution can be prepared by dissolving the concentrate in a suitable dextrose solution to give the desired concentration.

EXAMPLE 2

A dry potassium-free concentrate has the composition:

| | Parts by weight |
|---|---|
| Spray-dried sodium acetate | 100 |
| Sodium chloride | 226 |
| Magnesium acetate | 6.2 |
| Calcium chloride | 5.4 |
| Dextrose | 77 |

A solution useful for hemodialysis is prepared by dissolving 1076 grams of this mixture in 100 liters of water.

EXAMPLE 3

Another composition similar to that described in Example 1 has the composition:

| | Parts by weight |
|---|---|
| Spray-dried sodium acetate | 100 |
| Sodium chloride | 228 |
| Magnesium acetate | 6.2 |
| Calcium chloride | 5.4 |
| Dextrose | 78 |
| Potassium chloride | 5.8 |

A useful hemodialysis solution is prepared by dissolving 1091 grams of the dry concentrate in 100 liters of water.

EXAMPLE 4

A concentrate which provides 3 milliequivalents of calcium per liter, rather than 2.5 as in Examples 1–3, has the composition:

| | Parts by weight |
|---|---|
| Spray-dried sodium acetate | 100 |
| Sodium chloride | 223 |
| Magnesium acetate | 6.1 |
| Calcium chloride | 6.3 |
| Dextrose | 76 |
| Potassium chloride | 5.7 |

A useful hemodialysis solution is prepared by dissolving 1095 grams of the concentrate in 100 liters of water.

EXAMPLE 5

A concentrate which provides 5 milliequivalents of calcium per liter has the composition:

| | Parts by weight |
|---|---|
| Spray-dried sodium acetate | 100 |
| Sodium chloride | 218 |
| Magnesium acetate | 6.1 |
| Calcium chloride | 10.6 |
| Dextrose | 100 |
| Potassium chloride | 7.5 |

A useful hemodialysis solution is prepared by dissolving 1110 grams of this concentrate in 100 liters of water.

The preceding examples are merely illustrative. Many changes are possible without departing from the criteria set forth. For example, dextrose and/or the potassium salt may be omitted. Calcium or magnesium gluconates or lactates may be used as the source of calcium and magnesium ions. It is also possible to include an internal desiccant such as activated magnesium oxide. In each case the resulting mixture is stable and free-flowing when the mixture contains sodium acetate spray-dried to a moisture content not substantially exceeding 0.2% and the moisture content of the mixture is not substantially greater than 0.75%, both by weight.

Likewise, depending upon the needs of the patient and other considerations, the proportions of the salts can be varied. For example, the calcium and/or dextrose contents may be increased or reduced. Other desired variations may be made in the components and proportions of the ingredients without sacrificing the benefits of the invention. Such variations are necessary and desirable to obtain optimum results with a given mechanical unit.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

What is claimed is:

1. A dry chemical concentrate for a hemodialysis solution which comprises water-soluble, physiologically acceptable ionic salts of sodium, magnesium and calcium, said salts being in the form of chlorides, acetates, lactates or gluconates, a substantial proportion of the sodium being in the form of spray-dried sodium acetate having a moisture content not exceeding about 0.2% by weight, the total moisture content of the said composition being not substantially more than about 0.75% by weight.

2. A composition according to claim 1 wherein the said salts are selected from the chlorides, acetates, lactates and gluconates of sodium, magnesium and calcium.

3. A composition according to claim 1 which additionally comprises a water-soluble, physiologically acceptable ionic salt of potassium.

4. A composition according to claim 1 which additionally comprises dextrose.

5. A composition according to claim 1 wherein spray-dried sodium acetate comprises from about 30 to about 35% by weight of the sodium salt content.

6. A composition according to claim 2 wherein the sodium acetate has a moisture content not exceeding about 0.2% by weight.

7. A composition according to claim 4 wherein the sodium acetate has a moisture content not exceeding about 0.2% by weight.

References Cited

UNITED STATES PATENTS 3,352,779  11/1967  Austin et al. _____ 210—321X
3,412,865  11/1968  Lontz et al. _____ 210—321

SAMIH N. ZAHARNA, Primary Examiner

U.S. Cl. X.R.

210—22